UNITED STATES PATENT OFFICE.

ROBERT B. POTTS, OF CAMDEN, NEW JERSEY.

IMPROVED PROCESS FOR TREATING NAVASSA GUANO.

Specification forming part of Letters Patent No. 46,700, dated March 7, 1865.

*To all whom it may concern:*

Be it known that I, ROBERT B. POTTS, of Camden, in the county of Camden and State of New Jersey, have invented a new and useful improvement in treating Navassa Guano, or all guano containing more than six per cent. of iron and alumina; and I do hereby declare that the following is a full, clear, and exact description thereof, which will enable others skilled in the art to fully understand and make use of the same.

The object of this invention is to make a dry superphosphate of lime from Navassa guano, or all guano containing more than six per cent. of iron and alumina, by adding sulphuric acid in small portions at a time, keeping the batch agitated or stirred with such rapidity as to prevent heating as much as possible, and thereby keep the batch dry and granular, ready for sale in a few hours, instead of a wet and sticky mass, totally unsalable, as made by the old process.

The old method of making superphosphate of lime from Navassa guano was by adding the required quantity of sulphuric acid and working the batch altogether without paying any attention whether it was hot or cold, wet or dry, then wheeling into piles to digest and dry, which required from four to six months, and even at the end of that time the mass was wet and sticky, so as to be almost unsalable and requires so much labor and expense that the manufacture of superphosphate from Navassa guano has been entirely abandoned.

This improved process is carried out in the following manner: A quantity of guano—say two thousand seven hundred and fifty pounds—is spread on a floor and sprinkled over, by means of watering-pots or by suitable mechanism, with sulphuric acid. For the quantity of guano above named seventeen hundred and sixty pounds of acid of 52° Baumé are required. While sprinkling the acid on the guano the mass is constantly agitated or stirred with rakes or by suitable mechanism, so as to keep the guano in motion as fast as the acid is rained down on it. By these means the mass is prevented from agglutinating or sticking together and also from heating. After the whole quantity of acid has been added the batch can be sifted immediately, and after a day or two it can be barreled up and is ready for sale.

It is obvious that the above-named proportion between the guano and sulphuric acid has to be altered according to the nature of the guano and the strength of the acid, and the process can be carried out without regard to any specific proportion.

I claim as new and desire to secure by Letters Patent—

The within-described process of making superphosphate of lime from Navassa guano, or all guano containing more than six per cent. of iron and alumina, by sprinkling the requisite quantity of sulphuric acid over the guano in the form of rain, or as near as possible in that form, while the mass is continually agitated, substantially as and for the purposes set forth.

ROBT. B. POTTS.

Witnesses:
P. C. BUDD,
WILLIAM PAGE.